United States Patent [19]

Kaufmann

[11] 4,202,608
[45] May 13, 1980

[54] INSTRUMENT HAVING A LIQUID CRYSTAL DISPLAY

[75] Inventor: Meinolph Kaufmann, Fislisbach, Switzerland

[73] Assignee: BBC Brown Boveri & Company Limited, Baden, Switzerland

[21] Appl. No.: 895,130

[22] Filed: Apr. 10, 1978

[30] Foreign Application Priority Data

Jul. 26, 1977 [CH] Switzerland ................ 9211/77

[51] Int. Cl.² ............................................. G02F 1/13
[52] U.S. Cl. ................................. 350/339 R; 350/334
[58] Field of Search ................... 350/334, 339

[56] References Cited

U.S. PATENT DOCUMENTS 4,043,638   8/1977   Kaufmann ...................... 350/334

*Primary Examiner*—Edward S. Bauer
*Attorney, Agent, or Firm*—Oblon, Fisher, Spivak, McClelland & Maier

[57] ABSTRACT

An instrument having a liquid crystal display disposed behind a glass cover and separated from the cover by a hollow space. The hollow space is filled with an immersion medium to which is added a substance imparting thixotropic properties to the immersion medium. The added substance has a refractive index comparable to that of the immersion medium.

6 Claims, 2 Drawing Figures

INSTRUMENT HAVING A LIQUID CRYSTAL DISPLAY

BACKGROUND OF THE INVENTION

1. Field of the Invention

The invention relates to an instrument having a liquid crystal display arranged behind a glass cover, in which the hollow space between the front glass and the liquid crystal display is filled with an immersion medium.

2. Description of the Prior Art

In instruments having a liquid crystal display, for example measuring instruments, calculators and watches, the liquid crystal display element is located in a casing, the front side of which consists of a glass or plastic glass or of a industrial glass or sapphire glass. The liquid crystal display is located a few tenths of a millimeter behind this. Even when the liquid crystal display is in contact with the glass cover, minimal hollow spaces exist between the liquid crystal display and the glass cover. However even when the transparency of the glass is good, reflections and refractions arise at the top surfaces of the glass cover and at the surface of the display element and, in the case of unfavorable lighting conditions, for example in poor lighting or in the case of light incident vertically on the glass cover and dark surroundings, it is difficult to read the information displayed and to reduce the contrast of the display.

It is known from German Offenlegungsschrift 2,538,809 to improve the readability of the information shown by liquid crystal displays by filling the hollow space between the glass cover, and the liquid crystal display with an immersion medium. The immersion medium used for this is silicone oil or silicone rubber. This solution has proved advantageous with regard to the readability. Silicone oil is used when the distances between the glass cover and the liquid crystal display are very small and silicone rubber is used when these distances are less than 0.4 mm.

Silicone oil is of such low viscosity that such an immersion medium can be drawn out of the hollow spaces as a result of capillary interaction with the gaps and crevices in the module and between the module and the casing. This capillary interaction can produce formation of air bubbles in the watch display, which causes considerable difficulty in reading the information displayed. Complete sealing of the hollow space between the glass cover and the liquid crystal display would preclude the capillary interaction of the silicone oil, but displacement of air from the hollow space during assembly of the instrument is then no longer possible.

SUMMARY OF THE INVENTION

Accordingly, one object of the invention is to provide a novel liquid crystal display, which retains the advantageous characteristics of such displays found in the prior art.

Another object is to provide a novel liquid crystal display in which escape of the immersion medium is reliably prevented.

A further object is to provide a novel liquid crystal display which is not susceptible to escape of the immersion medium even when the distance between the display glass cover and the liquid crystal display is minimal, and especially when this distance is less than 0.4 mm.

These and other objects are achieved by providing a novel liquid crystal display with an immersion medium between the glass cover and the display. Added to the immersion medium is a substance which imparts thixotropic properties to the immersion medium, the added substance having a refractive index at least approximately equal to that of immersion medium.

Particular, suitable substances for the immersion medium are silicone oils or paraffin oils of low viscosity. These materials are electrically nonconductive and are chemically extremely stable. Paraffin oil of low viscosity has the advantage over silicone oil since the refractive index of paraffin oil is closer to that of the glass cover than is the refractive index of silicone. A suitable substance imparting thixotropic properties is preferably selected of submicroscopic pyrogenic silica made at 1100° C. and sold under the trademark "Aerosil", since the refractive index of Aerosil is identical to that of the paraffin oil. For an immersion medium which is readily spreadable but not free-flowing, a mixing ratio in which the proportion of the medium imparting thixotropic properties makes up about 8% of the weight of the immersion medium has proved particularly advantageous. For Guest-Host Displays, which do not require a polarizing film and therefore can be sensitive to UV radiation, it is advantageous to mix a substance which absorbs UV radiation into the immersion medium. A suitable UV-absorbing substance is, for example, one selected from substituted hydroxyphenyl benzotriazoles marketed under the trademark "Tinuvin".

BRIEF DESCRIPTION OF THE DRAWINGS

A more complete appreciation of the invention and many of the attendant advantages thereof will readily obtained as the same becomes better understood by reference to the following detailed description when considered in connection with the accompanying drawings, wherein.

DETAILED DESCRIPTION OF THE PREFERRED EMBODIMENTS

Figure 1:
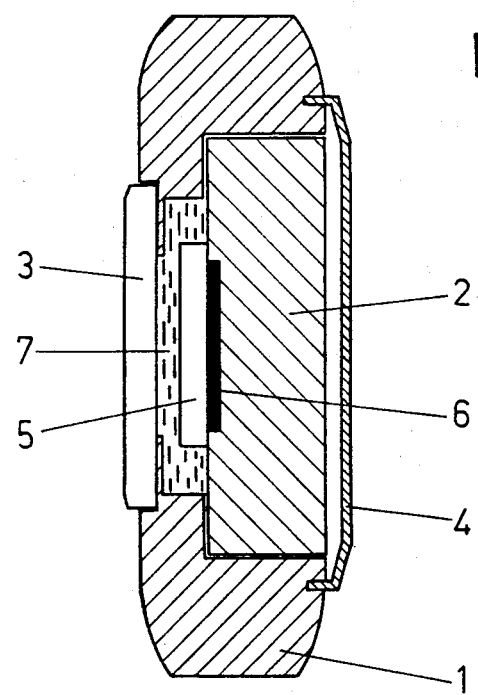
FIG. 1 is a sectional view through a watch having a liquid cyrstal display and an immersion medium.

Referring now to the drawings, wherein like reference numerals designate identical or corresponding parts throughout the several views, and and more particularly to FIG. 1 thereof, there is shown an electronic circuit 2 located in a watch case 1. The front side of the watch case 1 is provided with a glasss cover 3 and the rear side is formed by a base 4. A liquid crystal display 5 with a reflector 6 is located on the side of the electronic circuit 2 which faces the glass cover 3. The glass cover 3 and the liquid crystal display 5 are separated, and the space between the two is filled with an immersion medium 7.

A suitable immersion medium is a liquid or gelatinous substance which has a refractive index corresponding to that of the glass cover 3 and to which a medium for imparting thixotropic properties, which has approximately the same refractive index, has been added. It is necessary that the immersion base substance is electrically non-conductive and chemically inert.

Figure 2:
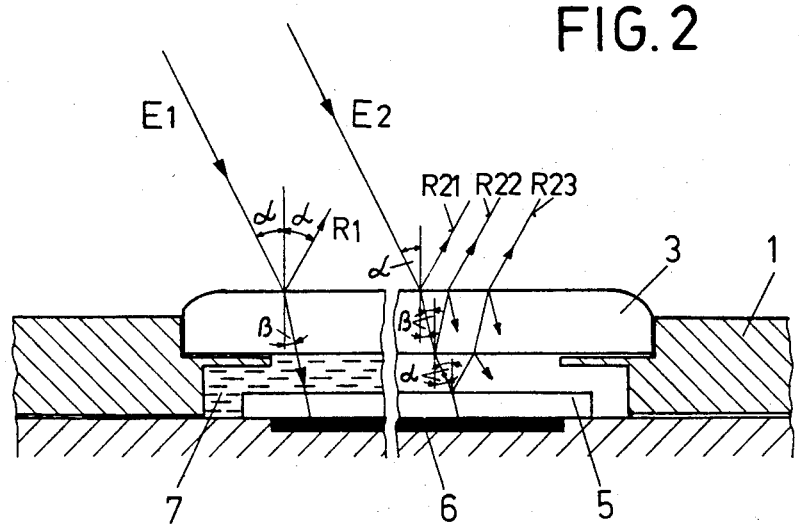
FIG. 2 is a sectional view through the front side of a watch having a liquid crystal display, and the particular path taken by rays of incident light with and without an immersion medium.

In the right-hand half of FIG. 2, a ray of light which is incident at an angle $\alpha$ to the vertical on the surface of the glass cover 3 is designated E2. Part of the ray is reflected (ray R21). The major part of the incident ray E2 is refracted and refraction is in accordance with the law of refraction: $\sin\alpha/\sin\beta = n$, in which $\beta$ designates the angle between the refracted ray and the vertical and n designates the refractive index. At the underside of the glass cover 3, part of the refracted ray is gain reflected (ray R22) and part is refracted, and the ray which has now undergone double refraction emerges from the glass cover 3 at the angle $\alpha$, since air is present in the space between the liquid crystal display 5 and the glass cover 3. The ray which has undergone double refraction is incident at the angle $\alpha$ on the surface of the liquid crystal display 5, where part of the ray is again reflected (ray R23) and part is refracted. The ray which has been attenuated by three refractions and by three partial reflections are incident on the relector 6.

The conditions are different with the arrangement according to the invention, as is illustrated in the left-hand half of FIG. 2. A ray of light E1 which is also incident at an angle $\alpha$ on the surface of the glass cover 3 is partly refracted and partly reflected (ray R1). The refracted ray passes at an angle $\beta$ to the vertical through the glass cover 3 and the immersion medium 7, which has approximately the same refractive index and virtually the same dispersion as the material of the glass cover 3, and through the liquid crystal display 5 and is incident without further refraction or reflection on the reflector 6. Only a single reflection and a single refraction of the ray of light E1 occurs upon using the immersion medium 7.

Of course, the use of an immersion media is not restricted to watches having a liquid crystal display; it is advisable in all instruments having a liquid crystal display, for example measuring instruments and calculators.

The advantages of the invention are to be seen, especially, in the fact (a) the immersion medium no longer escapes into the gaps and crevices within the casing, (b) the immersion medium is easily introduced because of its pasty state, (c) the surface of the display or of the polarizing film is well protected against moisture by the pasty immersion medium, and (d) the immersion medium adapts to any unevenness in the shape of the adjoining surfaces.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. In an instrument having a liquid crystal display disposed behind a glass cover and separated from said glass cover by a hollow space filled with an immersion medium, the improvement comprising:

said immersion medium containing a substance imparting thixotropic properties to said medium, said substance having a refractive index approximately equal to the refractive index of the immersion medium.

2. An instrument according to claim 1, said immersion medium comprises a silicone oil.

3. An instrument according to claim 1, wherein such immersion medium comprises paraffin oil of low viscosity.

4. An instrument according to claim 1, wherein said substance imparting thixotropic properties comprises a pyrogenic silica.

5. An instrument according to claim 4, wherein said substance imparting thixotropic comprises approximately 8% of the weight of the immersion medium.

6. An instrument according to claim 1, wherein said immersion medium comprises: a substance absorbing ultra-violet radiation.

* * * * *